Dec. 17, 1957     C. I. WORLEY, JR     2,816,753
VEHICLE WHEEL SUSPENSION
Filed Jan. 15, 1957
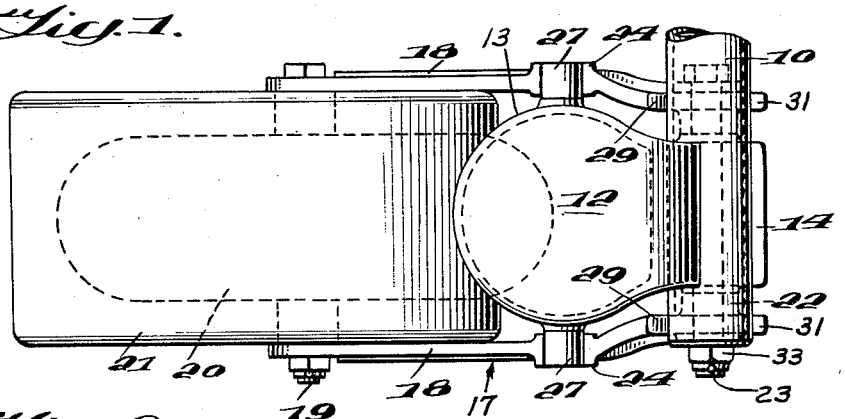
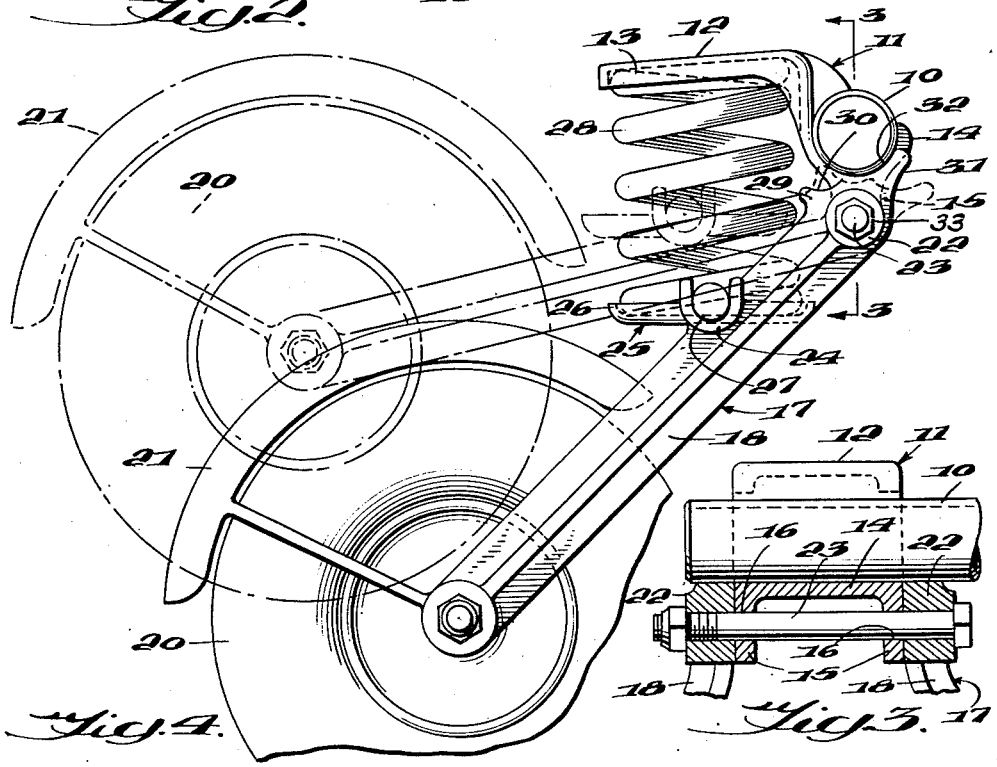
INVENTOR
CHARLES I. WORLEY, JR.
B. P. Fishburne, Jr.
ATTORNEY

2,816,753

VEHICLE WHEEL SUSPENSION

Charles I. Worley, Jr., Corpus Christi, Tex., assignor to E. L. Caldwell and Sons, Corpus Christi, Tex., a firm Application January 15, 1957, Serial No. 634,204

8 Claims. (Cl. 267—20)

This invention relates to improvements in wheel suspensions of vehicles.

An important object of the invention is to provide a wheel suspension or mounting particularly well adapted for supporting a boat trailer or the like, although not at all limited to this particular usage.

Another object of the invention is to provide a wheel suspension which is highly simplified, rugged and durable, inexpensive to manufacture and reliable and efficient in operation.

A further object is to provide a wheel suspension employing a compressible coil spring, and means for maintaining the opposite ends of the spring substantially parallel at all times, for a full circle of engagement with their end caps or retainers.

A further object is to provide in a wheel suspension of the above-mentioned character safety means for preventing complete collapsing or lowering of the suspension in the event of spring failure, as well as means for preventing accidental separation of the coil spring from the suspension mechanism, as when the vehicle is lifted, the last-mentioned means also aiding in the assembly of the device.

A further object is to provide a coil spring wheel suspension, so constructed that the full force or effectiveness of the spring is utilized in all positions of the pivoted wheel yoke.

A still further and more specific object is to provide means for allowing one spring end cap to pivot or adjust itself automatically relative to the yoke, as the latter swings vertically upon its pivot during the operation of the mechanism.

Other objects and advantages of the invention will be apparent during the course of the following description.

In the accompanying drawings forming a part of this application and in which like numerals are employed to designate like parts throughout the same, Figure 1 is a plan view of a wheel suspension mechanism embodying the invention, Figure 2 is a side elevation of the same, the mechanism being shown in a loaded position in broken lines, Figure 3 is a transverse vertical section taken on line 3—3 of Figure 2, Figure 4 is a fragmentary plan view on a reduced scale showing wheel suspension units of the invention applied to a boat trailer, or the like.

In the drawings, wherein for the purpose of illustration is shown a preferred embodiment of the invention, the numeral 10 designates a transverse horizontal frame member or pipe, which is the relatively stationary supporting member of the mechanism. In practice, for the purpose of illustration, the pipe 10 may be one of the transverse horizontal frame members of a boat trailer, such as the trailer shown in Figure 4 of the drawings. It should be understood as the description proceeds in connection with a single wheel mounting, that a particular application of the invention may employ any desired number of wheel units, as shown in Figure 4, for example. It should be further understood in connection with Figure 4, that the opposite ends of the members 10, not shown, also carry wheel units identical to those shown in Figure 4, and detailed in Figures 1 and 2 of the drawings.

With reference to Figures 1 to 3, the wheel suspension or mounting proper comprises an upper relatively stationary spring retainer or cap 11, including a substantially horizontal and generally circular flat upper plate 12, having a depending shallow marginal skirt 13, formed integral therewith, as shown. The upper retainer 11 further embodies a downwardly offset and upwardly open U-shaped extension 14, integral therewith, and engaging beneath the horizontal pipe 10 and rigidly secured thereto by welding or the like. As shown in Figure 1, the pipe engaging extension 14 may extend for a considerable portion of the width of the retainer 11 so as to afford a stable engagement with the relatively stationary pipe 10.

Near the opposite ends of the U-shaped extension 14, the same carries aligned depending lugs 15, integral therewith, spaced below the pipe 10 and element 14 and having aligned openings 16, Figure 3. The parts thus far described are integral with the upper spring retainer 11 and rigid upon the supporting pipe 10.

Coacting with the upper spring retainer 11 is a vertically swingable wheel carrying yoke 17 including a pair of spaced substantially parallel arms 18. The lowermost ends of the arms 18 are detachably rigidly connected by a wheel supporting axle means 19 of conventional character, upon which is journaled a desired ground engaging wheel 20, for free rotation. The wheel 20 may be provided with a mud guard 21, if preferred, suitably rigidly connected with the yoke 17. The upper ends of the arms 18 are provided with apertured bosses 22, integral therewith, for alignment and interfitting engagement with the depending lugs 15, Figure 3. The openings 16 of the lugs 15 are of substantially the same size as the apertures in the bosses 22 and adapted to register therewith, for the reception of a horizontal pivot bolt or element 23. The bolt 23 serves to freely pivotally secure the wheel yoke 17 to the depending lugs 15 of the upper spring retainer 11, so that the yoke may swing vertically.

Intermediate their ends, somewhat near the pivot bolt 23 and directly under the plate 12, the yoke arms 18 are provided upon their top sides with upwardly open U-shaped bearings 24, preferably formed integral therewith.

Disposed directly under the plate 12 in substantial vertical alignment therewith and centrally between the arms 18, is a circular substantially horizontal lower spring retainer or cap 25 having an upwardly projecting marginal flange 26, as shown. The lower spring retainer 25 is provided at diametrically opposite points with a pair of aligned horizontal trunnions 27, integral therewith, freely pivotally mounted within the U-shaped bearing 24 and serving with such bearings to bodily support the lower retainer 25.

A coil spring 28 of the desired strength is interposed between the upper and lower retainers 11 and 25, with its end coils arranged inwardly of the flanges 13 and 26 and held centered thereby. The opposite ends of the spring 28 are preferably substantially parallel, and the end coils of the spring engage the flat walls of the retainers 11 and 25 throughout the entire circumference of the spring.

In order to prevent complete collapsing or lowering of the suspension, in the event of failure of the spring 28, one or both of the arms 18 is provided near its top end and upon its rear side with a short stop lug 29, integral therewith, having an arcuate face 30 adapted for engagement with the underside of the circular pipe 10, to positively limit the upward swinging movement of the wheel yoke 17, and consequently the lowering of the trailer.

Similarly, to limit the downward movement of the yoke 17 and thus prevent accidental separation of the spring 28 from the mechanism, one or both of the arms 18 is provided at its upper end and just forwardly of the pivot 23 with an integral stop extension 31, having an arcuate face 32, for engagement with the circular pipe 10. The stop extension 31 engages the pipe 10 to positively limit the downward swinging movement of the yoke 17, as when the trailer is lifted. A further purpose of the extension 31 is to aid in the assembly of the mechanism. With the upper spring retainer 11 rigidly applied to the pipe 10 and the coil spring 28 arranged between the upper and lower retainers 25, and the latter supported by the bearing 24, the curved surface 32 of the stop 31 is brought into engagement with the pipe 10 and the yoke 17 is manipulated about the periphery of the pipe until the openings 16 are properly aligned with the apertures of the bosses 22. When this condition prevails, the bolt 23 is placed through the registering openings, and a nut 33 or the like is applied to it, and the assembling of the wheel suspension is complete.

In operation, the load upon the boat trailer or the like is transmitted to the wheel 20 through the member 10 and suspension mechanism. When the load suddenly increases, due to the wheel 20 striking a bump in the road, the yoke 17 swings upwardly about its pivot 23 and the coil spring 28 is compressed between the retainers 25 and 11 to absorb the shock. The upper retainer 11 remains stationary and substantially horizontal at all times, whereas the lower retainer 25 is moved bodily upwardly and downwardly with the yoke 17. However, due to the mounting of the trunnions 27 within the bearings 24, as the yoke 17 swings upwardly, the lower spring retainer 25 pivots automatically relative to the yoke, and remains level or horizontal and substantially parallel with the upper retainer 11, in all adjusted positions of the yoke 17. This arrangement enables the upper and lower ends of the coil spring to be parallel at all times, and maintain a full circle of contact with the flat faces of the opposed retainers 11 and 25. If the lower retainer 25 were not so pivoted relative to the yoke 17, it would become angled with respect to the upper retainer 11, and the coil spring 28 would have only portions of its end coils in engagement with the retainers 11 and 25, when the yoke 17 is in the elevated position, Figure 2. With the arrangement shown and described, the strength of the spring 28 is fully utilized for supporting the trailer in all adjusted positions of the yoke 17, and the arrangement affords a highly satisfactory resilient wheel suspension which is rugged and durable, and composed of a minimum number of parts which are inexpensive to manufacture and easy to assemble or install.

The three main elements of the mechanism, namely, the upper retainer 11, yoke 17 and lower retainer 25 are each adapted to be integrally cast from the desired metal, although it is intended not to so limit the invention, as these parts may be formed from any suitable material and in any manner found desirable.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described the invention, I claim:

1. A vehicle wheel suspension comprising a substantially horizontal support member, and upper spring retainer secured to the support member and having a depending part projecting below the support member, a wheel yoke having its upper end pivotally connected with said depending part and being vertically swingable and having a pair of spaced parallel arms, a substantially U-shaped upwardly opening bearing carried by each of said arms intermediate the ends of the arms and disposed under said upper retainer, a lower spring retainer arranged between said arms and provided at opposite sides with trunnions engageable within said bearings, whereby the lower retainer may pivot automatically relative to said yoke when the latter swings upon its pivot, and a coil spring arranged between the upper and lower retainers and having its ends engaging the retainers in all adjusted positions of said yoke.

2. A vehicle wheel suspension comprising a relatively stationary supporting member, an upper spring retainer fixedly secured to the supporting member, a wheel yoke pivotally connected with the supporting member and swingable toward and from the upper retainer, upwardly opening substantially U-shaped bearings carried by the yoke intermediate its ends, a lower spring retainer, trunnions secured to the lower retainer and engaging pivotally within said bearings and supporting the lower retainer in spaced opposed relation to the upper retainer and enabling the lower retainer to remain substantially horizontal and parallel with the upper retainer during pivoting of said yoke, and a coil spring extending between said retainers and having its opposite end coils engaging the same.

3. A vehicle wheel suspension according to claim 2, and a pair of positive stop elements secured to said yoke in spaced relation and adapted to engage said stationary supporting member when the yoke is pivoted to limit the swinging movement of the yoke in opposite directions.

4. A vehicle wheel suspension according to claim 2, and a pair of stop elements secured to said yoke in spaced relation near its upper end and adapted to engage said stationary supporting member for limiting the swinging of the yoke in opposite directions and thereby preventing complete collapsing of the wheel suspension in the event of spring failure and preventing separation of the spring from the suspension due to lowering of the yoke relative to said upper retainer.

5. A vehicle wheel suspension comprising a fixed frame member, an upper substantially level spring retainer fixed upon said member, a wheel yoke pivotally secured to said upper retainer and swingable toward and from the same, a ground wheel journaled upon the lower end of said yoke and bodily carried by the yoke, a pair of upwardly opening bearing elements secured to the yoke intermediate its ends, a lower spring retainer to be arranged in opposition to the upper retainer and having a pair of diametrically oppositely arranged trunnions pivotally engaging within said bearing elements, whereby the lower retainer is adapted to level itself automatically and remain substantially parallel to the upper retainer during swinging of the yoke, and a compressible coil spring extending between the upper and lower retainers and having its opposite end coils bearing against the retainers.

6. A vehicle wheel suspension comprising a fixed frame member, an upper spring retainer rigid with the frame member and including a spring coil engaging cap having a marginal flange and a depending generally U-shaped extension engaging under the frame member and secured thereto, depending apertured elements carried by said extension, a wheel yoke including spaced substantially parallel arms, said arms having openings near their upper ends registering with the apertures of said elements, a pivot element engageable within said openings and apertures for pivotally securing the wheel yoke to said upper retainer, a first stop element carried by the wheel yoke near its upper end for engagement with the frame member to positively limit upward swinging movement of the yoke, a second stop element carried by the yoke near its upper end and engageable with the frame member to positively limit downward movement of the yoke, a lower spring retainer arranged below the upper retainer and having a marginal flange and a pair of diametrically opposed trunnions, a pair of bearings carried by said arms of the wheel yoke intermediate the ends of the arms and pivotally receiving said trunnions, whereby the lower retainer is adapted to level itself automatically and remain parallel with the upper retainer, and a generally vertically extending coil spring contained between the upper and lower retainers and having its opposite end coils engaging the retainers throughout substantially the entire circumference of the spring.

7. A vehicle wheel suspension comprising a relatively stationary supporting member, an upper spring retainer secured to the supporting member, a downwardly inclined bifurcated wheel yoke pivoted relative to the supporting member and swingable in a substantially vertical plane toward and from said upper retainer, a lower spring retainer having trunnions at opposite sides thereof, bearing means carried by the opposite sides of said bifurcated yoke and receiving said trunnions for pivoting the lower spring retainer upon the yoke, and a coil spring extending between said upper and lower retainers and engaging them and being substantially vertical, the lower retainer pivoting automatically upon swinging of the yoke so as to remain substantially parallel at all times with the upper retainer.

8. A vehicle wheel suspension comprising a relatively stationary supporting member, an upper substantially horizontal spring retainer fixedly secured to the supporting member, a downwardly inclined pivoted bifurcated wheel yoke swingable in a vertical plane toward and away from said upper retainer, bearing means carried by opposite sides of the bifurcated wheel yoke intermediate its ends, and a lower spring retainer arranged in opposition to the upper retainer and having parts pivotally engaging the bearing means of the bifurcated wheel yoke, whereby the lower retainer is adapted to remain substantially parallel to the upper retainer notwithstanding the swinging of said yoke upon its pivot, the upper and lower retainers adapted to hold a substantially vertical coil spring between them with the ends of the spring engaging the retainers.

References Cited in the file of this patent

UNITED STATES PATENTS

| | | |
|---|---|---|
| 1,958,905 | Anderson | May 15, 1934 |
| 2,021,306 | Hathorn | Nov. 19, 1935 |
| 2,410,570 | Davis | Nov. 5, 1946 |
| 2,526,506 | Wiedman | Oct. 10, 1950 |

FOREIGN PATENTS

| | | |
|---|---|---|
| 485,831 | Great Britain | May 25, 1938 |